United States Patent

Shoji (10) Patent No.: US 6,680,483 B2
(45) Date of Patent: *Jan. 20, 2004

(54) IMAGE DETECTING DEVICE AND READOUT EXPOSURE APPARATUS THEREFOR

(75) Inventor: Takashi Shoji, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 156 days.

This patent is subject to a terminal disclaimer.

(21) Appl. No.: 09/824,630

(22) Filed: Apr. 4, 2001

(65) Prior Publication Data

US 2001/0025936 A1 Oct. 4, 2001

(30) Foreign Application Priority Data

Apr. 4, 2000 (JP) ........................................ 2000-102245

(51) Int. Cl.⁷ ............................................... G01T 1/115
(52) U.S. Cl. ....................................... 250/585; 250/591
(58) Field of Search ................................ 250/585, 591, 250/553, 578.1

(56) References Cited

U.S. PATENT DOCUMENTS

| 4,176,275 A | | 11/1979 | Korn et al. ................. 250/213 |
| 4,738,501 A | * | 4/1988 | Sunagawa et al. ............. 385/7 |
| 4,963,933 A | * | 10/1990 | Brownlee .................... 399/186 |
| 5,440,146 A | | 8/1995 | Steffen et al. ............... 250/580 |
| 5,510,626 A | | 4/1996 | Nelson et al. ............... 250/591 |
| 5,615,002 A | * | 3/1997 | Haneda et al. ............... 399/227 |
| 5,638,103 A | * | 6/1997 | Obata et al. ................ 347/164 |
| 5,712,674 A | * | 1/1998 | Doi .......................... 347/238 |
| 6,326,625 B1 | * | 12/2001 | Zur ........................ 250/370.09 |
| 6,326,636 B1 | * | 12/2001 | Isoda et al. ................ 250/586 |
| 6,469,312 B2 | * | 10/2002 | Agano ....................... 250/580 |
| 2001/0030305 A1 | * | 10/2001 | Shoji ........................ 250/591 |
| 2001/0052582 A1 | * | 12/2001 | Isoda ........................ 250/584 |
| 2001/0054683 A1 | * | 12/2001 | Shinichi .................... 250/235 |
| 2002/0028011 A1 | * | 3/2002 | Yasuda ...................... 382/132 |

FOREIGN PATENT DOCUMENTS

| EP | 0898421 | 2/1999 | ............ H04N/5/30 |
| JP | 2000/105297 | 4/2000 | ............ G21K/4/00 |

* cited by examiner

*Primary Examiner*—David Porta
*Assistant Examiner*—Christine Sung
(74) *Attorney, Agent, or Firm*—Sughrue Mion, PLLC

(57) ABSTRACT

The frequency of light source malfunctions is reduced and inconsistencies in exposure are controlled in a readout exposure apparatus for reading out radiation image data recorded as an electrostatic image on an image detecting device. The readout exposure device includes a light source having a plurality of LED chips, a first optical element for improving the quality of the light output, and a second optical element for focusing the light passing through the first optical element on the face of the image detecting device through two cylindrical lenses. The light output from each LED chip is focused in the direction perpendicular to the lengthwise direction of the light source. By irradiation of the image detecting device by the light not focused along the lengthwise direction of the light source, a plurality of pixels are simultaneously exposed by the light emitted from each light emitting point.

21 Claims, 6 Drawing Sheets

IMAGE DETECTING DEVICE AND READOUT EXPOSURE APPARATUS THEREFOR

BACKGROUND OF THE INVENTION

1. Field of the Invention

The present invention relates to an image detecting device and readout exposure apparatus therefor, and more particularly to a readout exposure apparatus for reading out image data stored on an image detecting device by scanning aforementioned image detecting device with readout electromagnetic radiation.

2. Description of the Related Art

There have been known in the field of medical radiology image readout systems employing photoconductive members such as panels composed of a-Se, etc., which are sensitive to X-rays, employed as light sensitive members or electrostatic recording members for improving diagnostic performance and reducing the quantity of radiation a subject is bombarded with, wherein an electrostatic recording member is irradiated by X-ray, etc. radiation carrying radiation image data, a latent image charge carrying the radiation image data is placed on the electrostatic recording member, after which, by scanning the light sensitive member with a laser beam a current is produced therein, and by detection of that current by the flat electrodes or stripe electrodes on both sides of the light sensitive member, the electrostatic latent image carried by the latent image charge, that is, the radiation image data (see for example, U.S. Pat. Nos. 4,176,275, 5,440,146, and 5,510,626, "A Method of Electronic Readout of Electrophotographic and Electroradiographic Images"; Journal of Applied Photographic Engineering, Volume 4, Number 4, Fall 1978 pp178–182 (hereinafter referred to as 1), etc.).

In the systems described in U.S. Pat. Nos. 4,176,275 and 5,510,626, and document 1, a narrow line of light formed by the expansion of a beam output by an argon laser is focused onto the light sensitive member by a cylindrical lens in the apparatus, so that the narrow line of light is mechanically deflected and scanned over the light sensitive member. The stored electrostatic image is readout in a linear manner by a plurality at line electrodes arranged in a stripe pattern.

In addition, a readout system for reading out radiation image data stored on an electrostatic recording member comprising a first photoconductive layer transparent to recording radiation, a recording photoconductive layer that exhibits conductivity upon irradiation thereof by recording radiation, a charge transport layer that acts substantially as an insulator to charges in the same polarity as that of the charge placed on the first photoconductive layer and substantially as a conductor to charges in the reverse polarity thereto, a readout photoconductive layer that exhibits conductivity upon irradiation thereof by readout radiation, and a second photoconductive layer, which is transparent to readout radiation, superposed one on the other in that order, has been proposed in Japanese Patent Application No. 10(1999)-232824.

According to the readout apparatus disclosed in Japanese Patent Application No. 10(1999)-232824, an electrostatic recording member is scanned by readout electromagnetic radiation generated by a light source, and the electrostatic image stored in the electrostatic recording member is readout. A line-shaped exposure light means, a laser beam scanning means, etc. have been proposed for use as the readout exposure apparatus, which is a light source for emitting readout electromagnetic radiation. Further, a plurality of light emitting points arranged in a line, etc. has been proposed for use as a line-shaped exposure apparatus.

When such a line-shaped exposure means having a plurality of light emitting points arranged in a line is used as the readout exposure apparatus of the detecting device described above, the light emitting points can be considered to be in a relationship of a one-to-one correspondence with the irradiation points (readout pixels) on the detecting device. However, in such a system, when on of the light emitting points malfunctions and a decrease in the quantity of light output is thereby decreased, because the exposure light for the corresponding irradiation point on the detection device is insufficient, a malfunction of only one of the light emitting points from among the plurality of light emitting points is regarded as a malfunctioning of the light source. In addition, if there is inconsistency between light emitting points with regard to the quantity and angle at which light is emitted, as a result, a problem arises in that artifacts occur in the images.

SUMMARY OF THE INVENTION

The present invention has been developed in consideration of the circumstances described above, and it is a main objective of the present invention to provide a readout exposure apparatus in which the frequency of light source malfunction is reduced and inconsistencies in exposure are controlled.

The readout exposure apparatus for reading out data recorded on an image detecting device by scanning said image detecting device with readout electromagnetic radiation according to the present invention comprises an exposure light source having a plurality of light emitting points arranged in a line, a first optical means, which has an optical member for focusing said electromagnetic radiation through an opening having a slit, that spatially filters the electromagnetic radiation emitted from each of the light emitting points of the exposure light source, wherein the electromagnetic radiation emitted from each light emitting point passing through the first optical means enters the image detecting device after having been dispersed along the lengthwise direction of said exposure light source, whereby each portion of the image detection device is simultaneously exposed to the electromagnetic radiation emitted from multiple light emitting points from among said plurality of light emitting points.

The expression "each portion of the image detecting device" refers to each portion of the image detecting device included exposure zone.

Note that it is desirable that the slit opening extend in the lengthwise direction of the exposure light source, and that the optical member focus the electromagnetic radiation emitted from each light emitting point in the direction perpendicular to the lengthwise direction of the exposure light source.

In addition, it is desirable that a second optical means be provided for focusing the electromagnetic radiation passing through the first optical means in the direction perpendicular to the lengthwise direction of the exposure light source.

Note that the optical member can be a SELFOC lens and the second optical means a cylindrical lens, or both the optical member and the second optical means can be cylindrical lenses.

Note that aforementioned exposure light source can be a plurality of LED or LD chips arranged in a line, or it can be an LED or LD array.

Note that the image detection device can be an electrostatic recording member that records image data as an electrostatic latent image, and by scanning thereof by readout electromagnetic radiation a current corresponding to aforementioned electrostatic latent image can be generated, or it can be a stimulable phosphor sheet that cumulatively stores image data and emits a stimulated emission corresponding to aforementioned image data upon irradiation thereof by readout electromagnetic radiation.

Note that the referent of the expression "electromagnetic radiation" includes all wavelengths of light in the visible range, infrared range, etc., and for cases in which the image detecting device is an electrostatic recording member, can be any wavelength by which the "electrostatic latent image" can be readout, and for cases in which the image detecting device is a stimulable phosphor sheet, any wavelength of light that causes stimulated emission to be emitted can be used as the stimulating light. This holds true for that described below.

As described above in the description of the prior art, a light source comprised of a plurality of light emitting points arranged in a line can be used as the aforementioned readout exposure apparatus. If the light source is formed of N light emitting points, if each light emitting point corresponds to an irradiation point on the detecting device in a one-to-one relation, and if the apparatus is defined as being in a state of malfunction when an individual light emitting point malfunctions, then the malfunction rate of the apparatus is expressed as equal to (the malfunction rate of each single light emitting point)×N, where "x" stands for a multiplication sign.

In addition, if the inconsistency in the quantity of light emitted by the light emitting points in this case is A % (where the area irradiated by each exposure point is the same anywhere), the rate at which inconsistencies occur in the exposure of each point on the detecting device is also A %.

However, according to the readout exposure apparatus of the present invention, because the detecting device is uniformly exposed by any number of exposure light emitting points, for example, M points (M≧2), if an individual point among those points malfunctions and ceases emitting light, the reduction in the quantity of exposure light is only 1/M, and because the malfunctioning of a single light emitting point does not directly result in a malfunctioning of the entire apparatus, the rate of malfunction can be reduced compared to the case described above.

In addition, even if the rate of the inconsistency in the quantity of light emitted from the light emitting points is A % (where the area irradiated by each exposure point is the same anywhere), because each point on the detecting device is irradiated by M light emitting points, the inconsistency in the quantity of exposure light is, on average, A/M %, which is a reduction compared to the above described case.

That is to say, the rate of malfunction and the inconsistency in the quantity of the exposure light emitted are reduced in the readout exposure apparatus according to the present invention, and readout of an image having a reduced number of artifacts occurring of artifacts can be obtained.

Further, because readout exposure apparatus according to the present invention exhibits a level of performance and serviceable life span that is the same or better than conventional readout exposure apparatus, the life required for conventional light emitting elements is no longer necessary, and the specification regarding the inconsistency in the quantity of light emitted is not as stringent as it was for conventional light emitting elements. Accordingly, yield can be improved.

Still further, by providing a first optical means for spatially filtering the electromagnetic radiation emitted from each light emitting point of the exposure light source, the quality of the electromagnetic radiation emitted from each light emitting point can be improved.

DESCRIPTION OF THE PREFERRED EMBODIMENTS

Hereinafter, a preferred embodiment of the present invention will be explained with reference to the drawings.

Figure 1A:
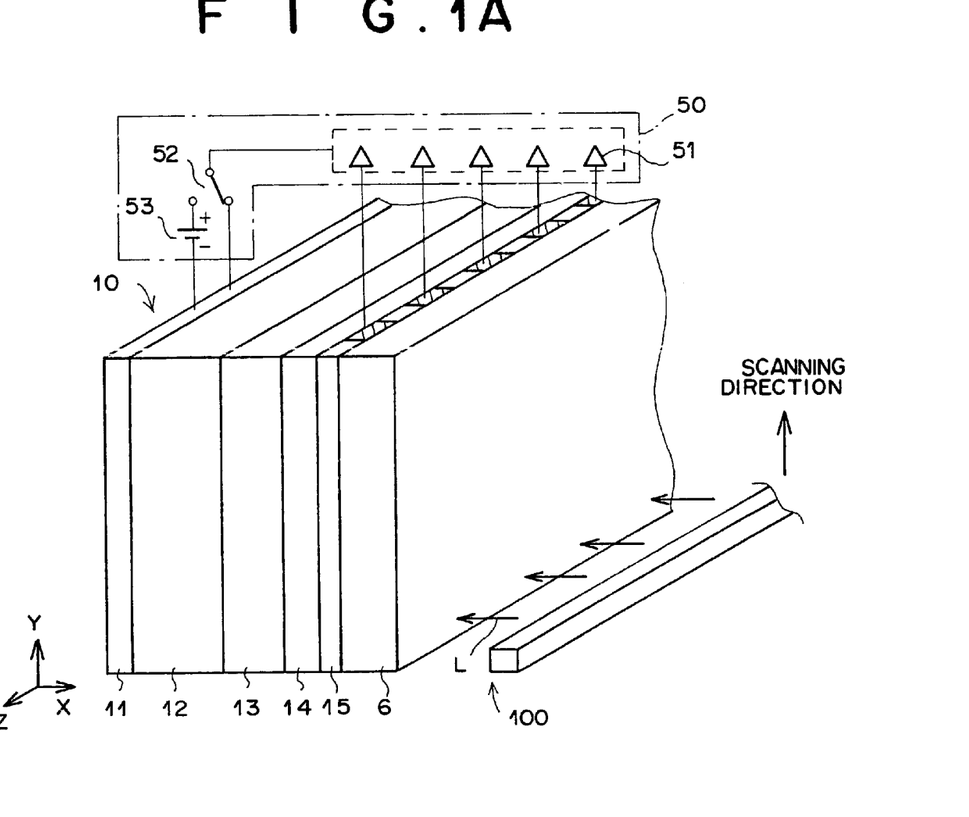
FIGS. 1A and 1B are a schematic perspective view and a schematic cross-sectional view along the line X-Z, respectively, of an image detection and readout system employing an electrostatic recording member and implementing the readout exposure apparatus according to the present invention.
Figure 1B:
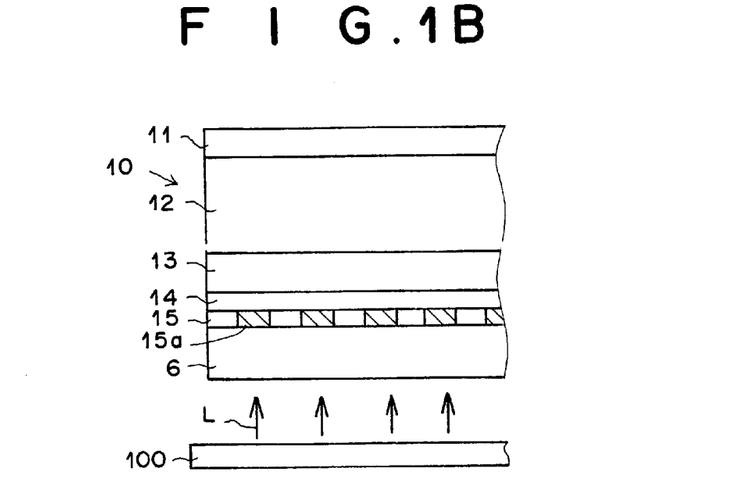

FIGS. 1A and 1B are a schematic perspective view and a schematic cross-sectional view along the line X-Z, respectively, of an image detection and readout system employing an electrostatic recording member and implementing the readout exposure apparatus according to the present invention. As shown therein, this system comprises an electrostatic recording member 10 formed on a glass substrate 6, a readout exposure apparatus 100 for irradiating said electrostatic recording member 10 with readout electromagnetic radiation (hereinafter referred to as "readout light") when performing readout of image data, and a current detection means 50 for detecting the electrical current flowing from electrostatic recording member 10 due to scanning thereof by the readout light.

Electrostatic recording member 10, which is a radiation image detecting device, records radiation image data as an electrostatic latent image, and emits an electrical current corresponding to said electrostatic latent image upon being scanned by readout light and, more specifically, comprises a photoconductive layer 11, which is transparent to recording-use radiation (for example X-rays; hereinafter referred to as "recording light"), a recording photoconductive layer 12 that exhibits conductivity in response to irradiation thereof by recording light, a charge transport layer 13 that acts substantially as an insulator to the charge placed on the first photoconductive layer (latent image polarized charge; for example, a negative charge) and as a conductor to the charge in the reverse polarity to said charge (transport polarized charge; a positive charge in the example described above), a readout photoconductive layer 14 that exhibits conductivity in response to irradiation thereof by readout light, and a second photoconductive layer 15 that is transparent to readout light, superposed one on the other. The second photoconductive layer 15, as shown by the diagonal lines in the drawings, is a stripe electrode (refer to the electrostatic recording member described in Japanese Patent Application No. 10(1998)-232824, for example) formed of a plurality of elements 15*a* (line-shaped electrodes) disposed along the pitch of the pixels.

Current detection means 50 comprises a plurality of current detection amps 51, each of which is connected to an element 15*a* of photoconductive layer 15, and the current caused to flow within each element 15*a* by exposure to readout light is detected in linear order thereof. The first photoconductive layer 11 of radiation image detection device 10 is connected to one input terminal of a connecting means 52 and to the negative terminal of a power source 53, and the positive terminal of power source 53 is connected to the other input terminal of connecting means 52. Although not shown in the drawings, the output of connecting means 52 is connected to each current detection amp 51. Because it has no relation to the gist of the present invention, explanation of the details of the structure of detection amps 51 is omitted, however, it is possible to apply any of the various generally known constructions thereof. Note that according to the structure of detection amp 51, the connection state thereof with connecting means 52 and power source 53 is, of course, different from the example described above.

Hereinafter, the operation of the radiation image detection and readout system of the configuration described above will be explained.

When recording an electrostatic image on radiation image detection device 10, first, connecting means 52 is switched with power source 53, and a DC current is applied between the first photoconductive layer 11 and elements 15*a* of the second photoconductive layer 15, whereby a charge is placed on both photoconductive layers. In this way, a series of U-shaped electrical fields, in which positions of elements 15*a* correspond to bottoms of individual U-shapes, are generated between the first photoconductive layer 11 and elements 15*a* within radiation image detecting device 10.

Next, the subject (not shown) is bombarded with recording light, and the recording light passing through the subject, that is, the radiation rays carrying the radiation image data, is irradiated onto radiation image detecting device 10, whereupon positive and negative charges are generated within readout photoconductive layer 12 of radiation image detecting device 10. The negative charges among aforementioned positive and negative charges are concentrated in elements 15 along aforementioned electrical field and stored in the interface between recording photoconductive layer 12 and charge transport layer 13. The quantity of this stored negative charge (latent image charge) is substantially proportional to the quantity of radiation that has irradiated radiation image detecting device 10, and this latent image charge carries the electrostatic latent image. In this way, the electrostatic image is recorded on radiation image detecting device 10. On the one hand, the positive charges generated within recording photoconductive layer 12 are drawn toward the first photoconductive layer 11, where they are recoupled with negative charges injected from the power source and eliminated.

When reading out an electrostatic latent image from radiation image detecting device 10, first, connecting means 52 is connected to the first photoconductive layer 11 side of radiation image detecting device 10.

Line-shaped readout light L emitted from readout exposure apparatus 100 passes through glass substrate 6 and each element 15*a* of photoconductive layer 15 of radiation image detecting device 10, whereupon positive and negative charges are generated within photoconductive layer 14. The positive charges thereamong are drawn toward the negative charges (latent image charge) stored in the interface between recording photoconductive layer 12 and charge transport layer 13, whereby they move rapidly within charge transport layer 13, and are recoupled with the latent image charge stored at the interface between recording photoconductive layer 12 and charge transport layer 13 and eliminated. On the other hand, the negative charges generated within readout photoconductive layer 14 are recoupled with the positive charges injected into photoconductive layer 15 and eliminated. In this way, the negative charges stored in radiation image detecting device 10 are recoupled and eliminated, and a current due to the movement of charges during this recoupling occurs in radiation image detecting device 10. This current is detected in a linear manner for each element 15*a* by each current detection amp 51 connected thereto. Because the current flowing within radiation image detecting device 10 during performance of readout corresponds to the latent image charge, that is, the electrostatic latent image, by detection of this current, readout of the electrostatic latent image can be performed. Note that readout exposure apparatus 100 scans in the direction of the arrow in the drawing, by which the entire surface of radiation image detecting device 10 is exposed.

Figure 2A:
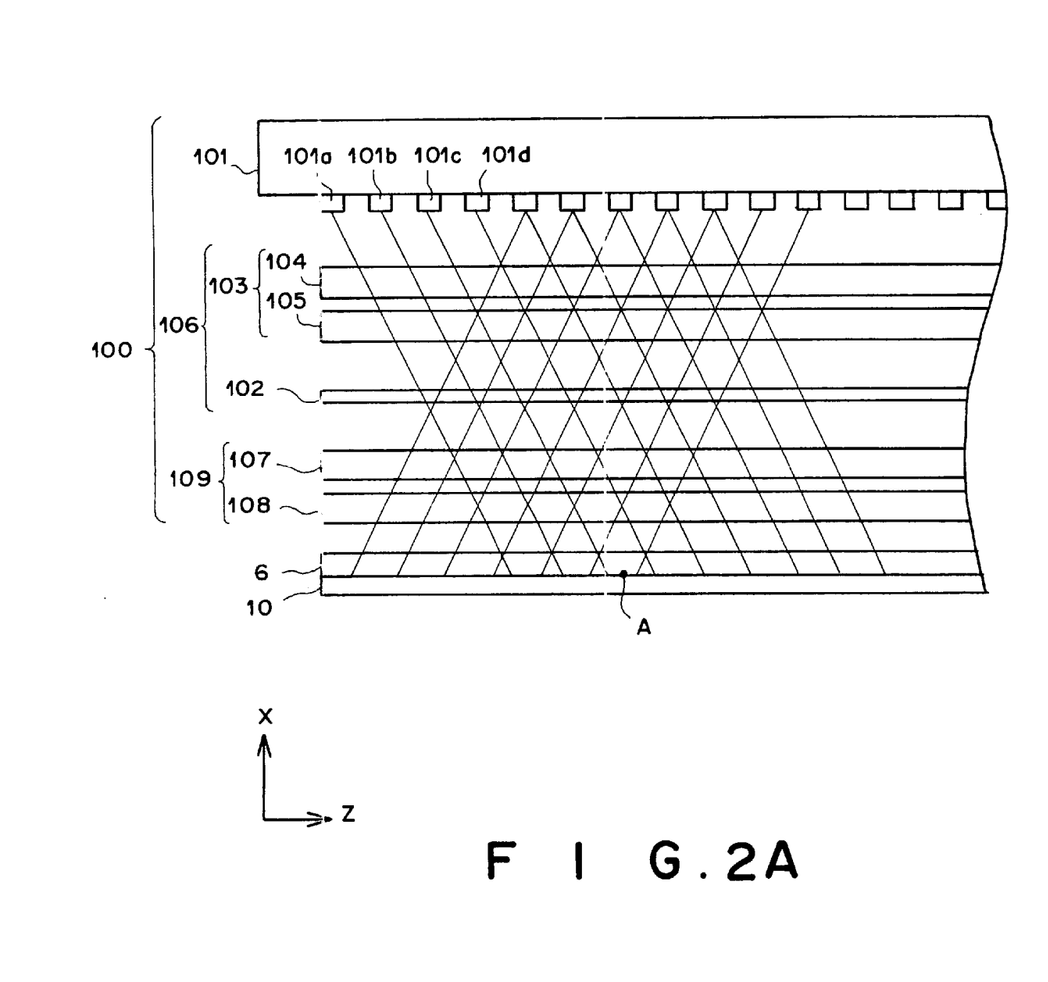
FIGS. 2A and 2B are schematic cross-sectional views of the readout exposure apparatus of the current embodiment according to the current invention.

Next, implemented in a radiation image detection and readout system, the configuration and operation of readout exposure apparatus 100 according to a first preferred embodiment of the present invention shown in FIGS. 2A and 2B will be explained. FIG. 2A is a schematic sidelong cross-sectional view from the direction Y showing the detailed structure of readout exposure apparatus 100 of FIG. 1, and FIG. 2B is a schematic cross-sectional view along the line X-Y of readout exposure apparatus 100.

Figure 2B:
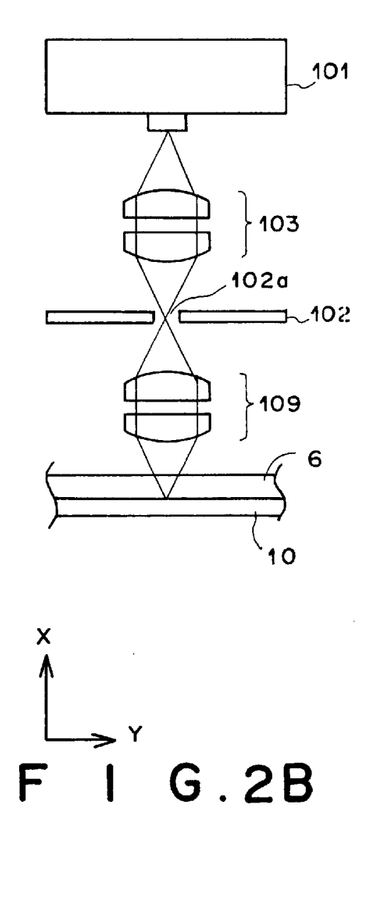

As shown in FIGS. 2A and 2B, readout exposure apparatus 100 comprises light source 101 formed of a plurality of LED chips 101*a*, 101*b*, . . . lined up along the direction of axis Z, a first optical means 106 for improving the quality of the light emitted from said light 101, having slit 102 with an opening 102*a* extending along the lengthwise direction of light source 101 and an optical element 103 formed of cylindrical lenses 104 and 105, which focus light toward the opening 102*a* of said slit 102, and a second optical means 109 including cylindrical lenses 107 and 108 for focusing light passing through the first optical means 106 onto the surface of the image detecting device in the direction perpendicular to light source 101.

Slit 102 spatially filters the light emitted from light source 101 to restrain flare light, and determines the diameter of the beam irradiated on the detection device. Note that it is preferable if the slit can control the spatial expansion of the light beam, and not only a mechanical slit filter having an opening as in the current embodiment, but a density distribution filter, etc. optical gap filter may also be employed.

The light emitted from each light emitting point of light source 101, that is, from each of LED chips 101, 102, . . . is filtered and focused by cylindrical lenses 104 and 105 along the lengthwise direction thereof, and is then focused by cylindrical lenses 108 and 109 of the second optical means in the direction perpendicular to the lengthwise direction of the light source and irradiated onto the surface of image detecting device 10. Because the original light beam emitted from each LED chip deverges isotropically, and because the length wise component thereof is not collected by the cylindrical lenses 104 and 105, the light from each chip is dispersed on the detecting device only in the lengthwise direction of the light source. In this way, the light from light source 101 is irradiated in a line shape on the detecting device, and the plurality of pixels lined up along said line shape is exposed to the light from each chip at the same time. That is to say, each pixel on the detecting device is exposed simultaneously by the light emitted by the plurality of LED chips. For example, FIG. 2 shows a typical example in which point A on image detecting device 10 is simultaneously exposed by the light from 7 individual LED chips.

More specifically, for example, if an optical focal point of 40 mm, a pixel size of 100 $\mu$m, an LED chip interval (light emitting point interval) of 200 $\mu$m, and an expansion angle of the light emitted from the LED chips of 120° (radius) are employed, the pixels on the detecting device are simultaneously exposed to light emitted from 700 or more individual LED chips. Accordingly, if for some reason an LED chip ceases to emit light, the reduction of output exposure light thereby is an infinitesimally small 1/700 or less. In addition, even if there is an inconsistency rate of A % in the quantity of light emitted from each LED chip, the inconsistency in the amount of light is reduced to A/700%.

Note that in the readout exposure means 100 described above, as shown in FIG. 3, a SELFOC lens 110 can be employed instead of cylindrical lenses 104 and 105 of the first optical means. The elements in FIG. 3 that are the equivalent of those in FIG. 2 are likewise labeled, and where not particular necessary, further explanation thereof is omitted. For cases in which the first light means 106' employs a SELFOC lens 110, the light emitted from each light emitting point 101a, 101b, . . . is isotropically focused by SELFOC lens 110 onto slit opening 102a. In this case, light passing through slit 102 is isotropically dispersed from slit opening 102a, and then focused by cylindrical lenses 107 and 108 in the direction perpendicular to the lengthwise direction of the light source, and is not focused in the lengthwise direction of the light source. In this way, light emitted from the light source 101 is irradiated in a line shape into detection device 10 in the same way as in the case described above, and the light from each LED chip simultaneously exposes a plurality of pixels.

Figure 3A:
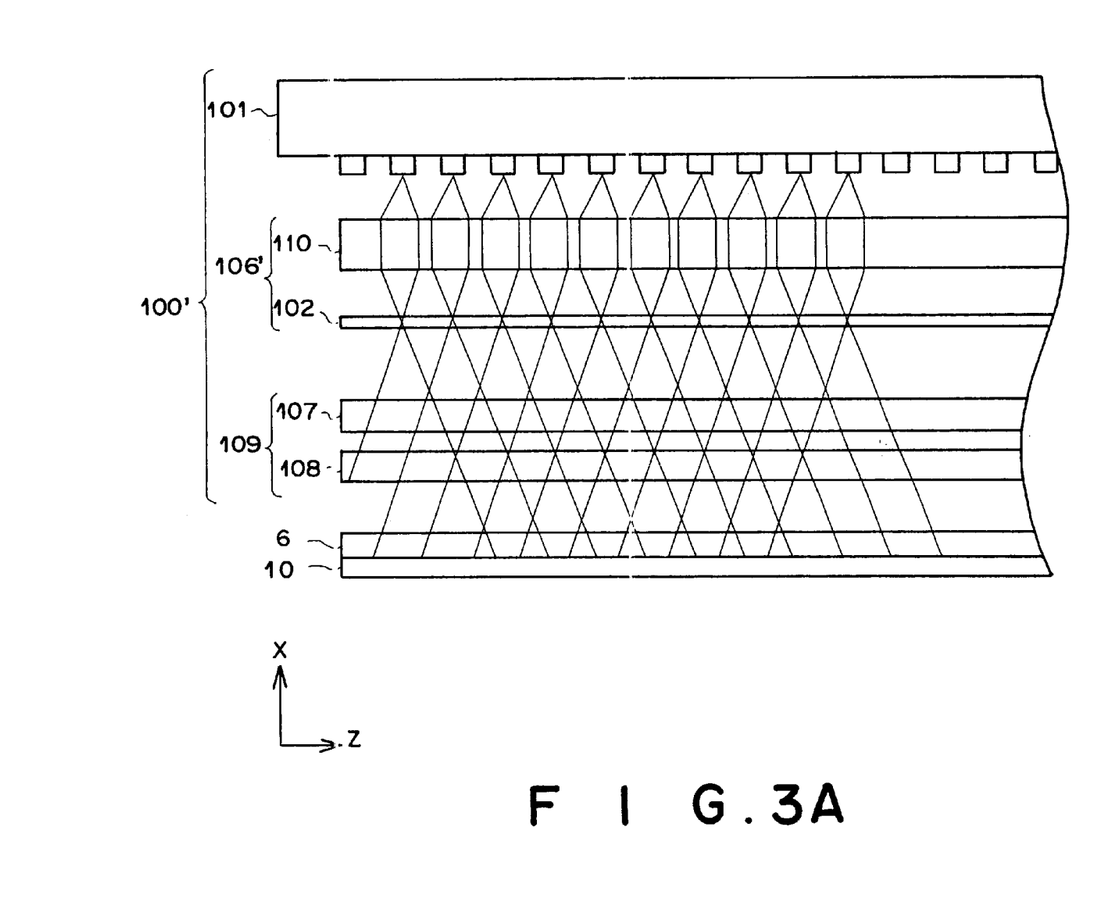
FIGS. 3A and 3B are schematic cross-sectional views of an embodiment of the readout exposure apparatus of FIGS. 2A and 2B implementing a SELFOC lens as the optical member.
Figure 3B:
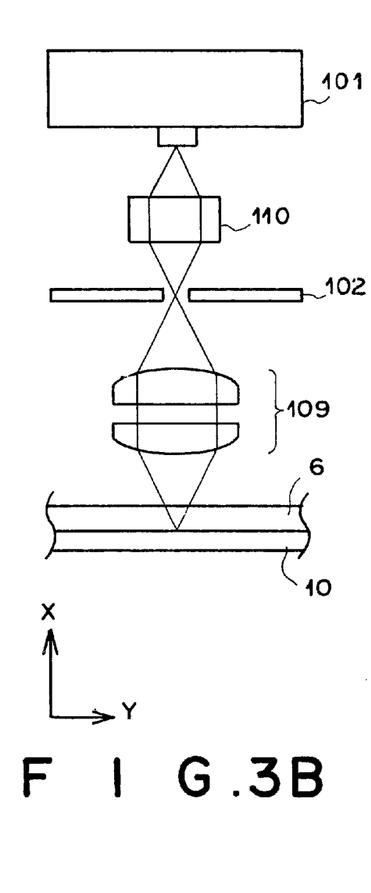

Note that when SELFOC lens 110 is employed, opening 102a of slit 102 can be a pinhole like opening formed in the lengthwise direction corresponding to each LED chip.

Figure 4A:
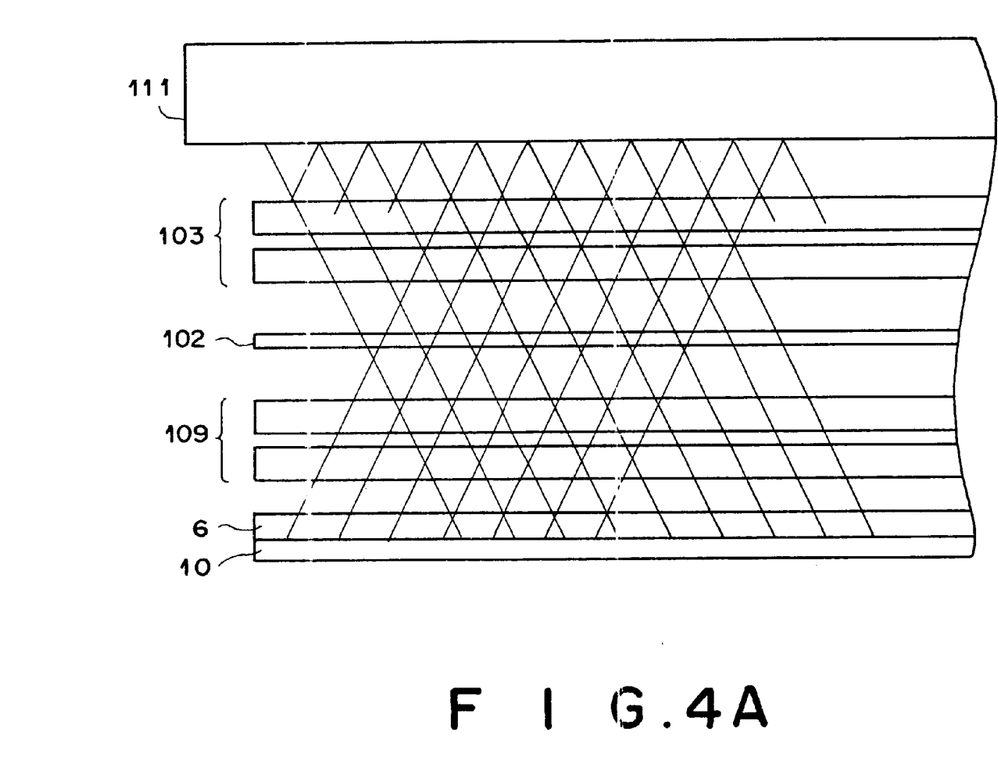
FIGS. 4A and 4B are schematic cross-sectional views of an embodiment of the readout exposure apparatus of FIGS. 2A and 2B implementing an LED array as the light source.
Figure 4B:
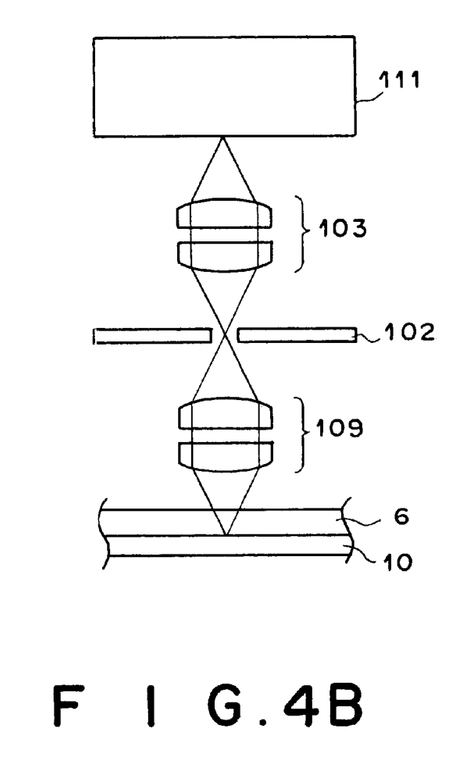

In addition, light source 101 of readout exposure apparatus 100 described above was formed of a plurality of lined up LED chips, however, it can also be formed of a plurality of lined up LD chips in place of the LED chips. In addition, as shown in FIGS. 4A and 4B, an LED array 111 formed of a plurality of light emitting points arranged in a line shape, or an LD array may be utilized as the light source.

Note that in the explanation given above, the readout exposure apparatus according to the present invention employed the electrostatic recording member disclosed in Japanese Patent Application No. 10(1998)-232824, however, the present invention is not limited to this. That is to say, any radiation image detecting device in which a current corresponding to an electrostatic charge carrying radiation image data is generated by irradiation thereof by readout light can be applied. For example, the electrostatic recording member disclosed in Japanese Patent Application No. 11(1999)-087922 ca be employed.

Next, another preferred embodiment implementing the present invention, shown in FIG. 5, will be explained.

Figure 5:
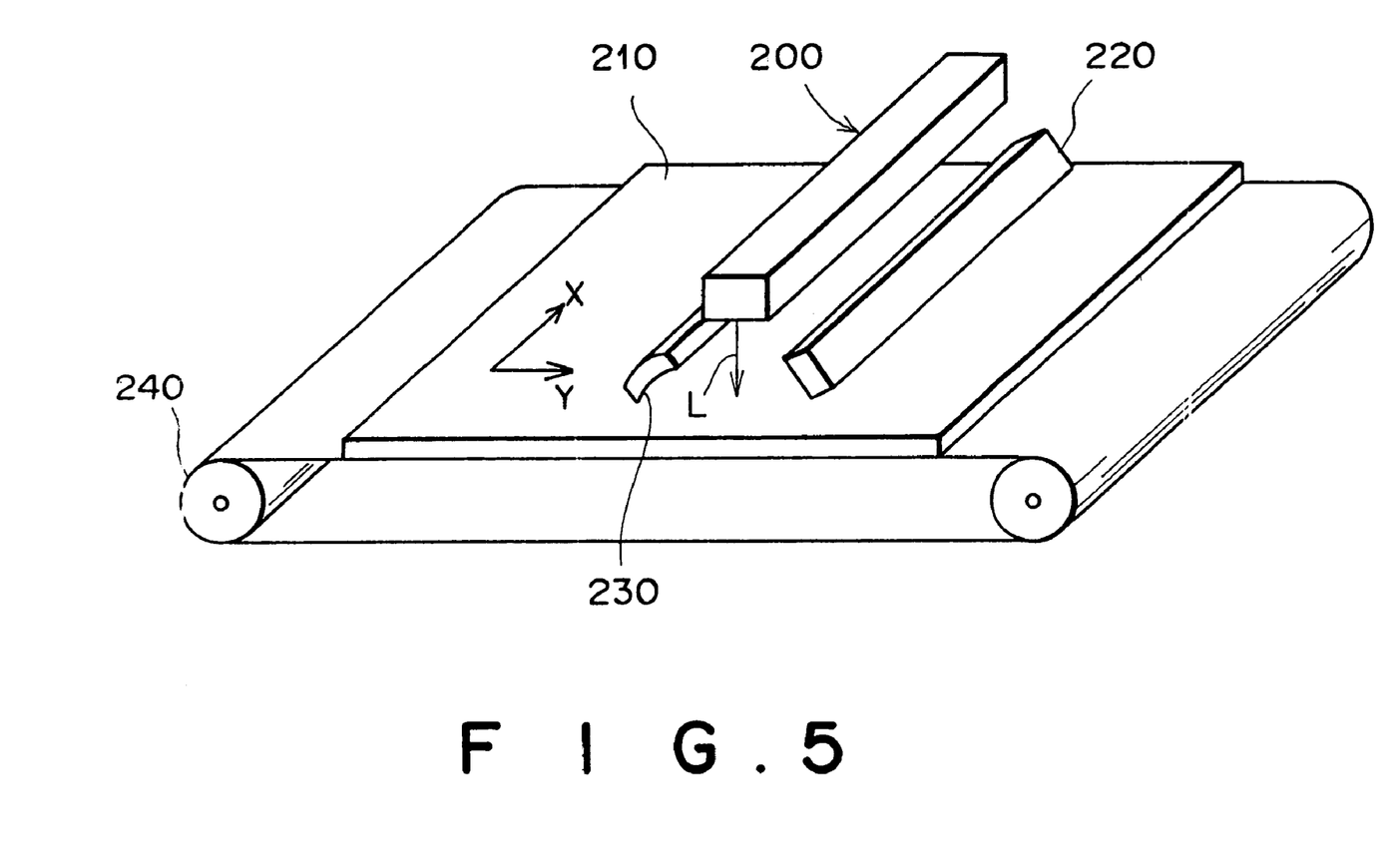
FIG. 5 is a schematic cross-sectional view of an image readout system, which reads out image data from a stimulable phosphor sheet, implementing the readout exposure apparatus according to the present invention.
Figure 6:
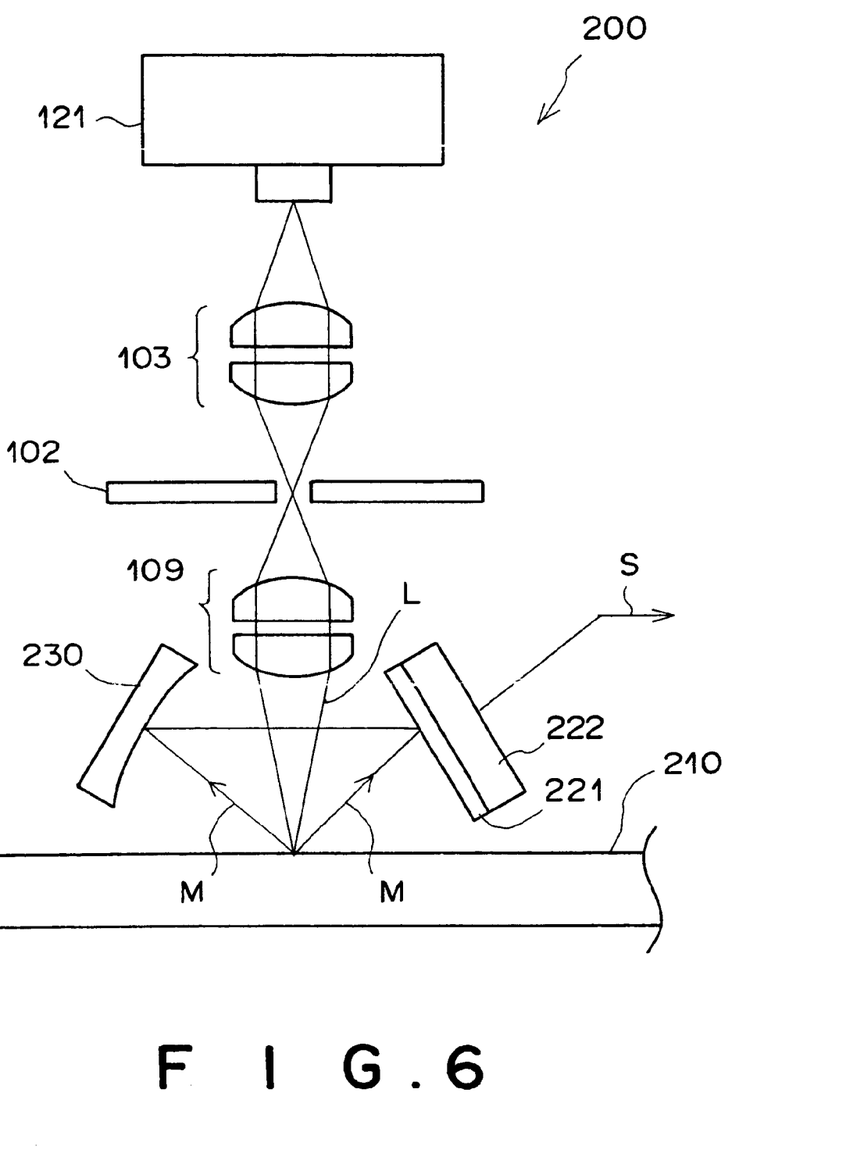
FIG. 6 is a schematic cross-sectional view showing the detailed configuration of the readout exposure apparatus according to the present invention implemented in an image readout system for reading out image data from a stimulable phosphor sheet.

FIG. 5 is a shows an image readout system for reading out image data from a stimulable phosphor sheet implementing the readout exposure apparatus according to the present invention. Note that FIG. 6 is a blown up cross-sectional view of the detailed configuration of the exposure apparatus of FIG. 5 and stimulated emission M.

This image readout system comprises readout exposure apparatus 200 according to the present invention for irradiating with readout electromagnetic radiation (in the current embodiment, referred to as "stimulated emission") a stimulable phosphor sheet 210 on which radiation image information has been cumulatively stored, a light detection device 220 extending in the direction of arrow X for detecting stimulated emission M emitted from stimulable phosphor sheet 210 upon irradiation by stimulating light L, a stimulating light cutoff filter disposed on the light-entry side of photo detector 220 so that stimulating light L does not enter light detection device 220, a light collecting mirror 230 provided on the surface side of sheet 210 and extending in the direction of arrow X 210 for efficiently guiding stimulated emission M to light detection device 220, a sheet conveying means 240 consisting of a belt conveyor for conveying stimulable phosphor sheet 210 in the direction of arrow Y, and a signal processing section (not shown), which is connected to photo detector 220. Note that photo detector 220 is formed of a plurality of photoelectric converting elements 222 disposed along the lengthwise direction thereof, and each electrical converting element 222 detects the stimulated emission at a corresponding location (each pixel) on stimulable phosphor sheet 210. More specifically, amorphous silicon sensors, CCD sensors, MOS sensors, etc. can be employed as photoelectric converting elements 222.

Note that the configuration and operation of readout exposure apparatus 200 as the same as that of the embodiments described above; components in common therewith are likewise labeled and more detailed explanation thereof is omitted. However, light source 121 of readout exposure apparatus 200 is provided so that it is capable of outputting light of the optimal wavelength for producing stimulated emissions from the stimulable phosphor sheet.

Next, operation of the radiation image data readout apparatus of the current embodiment will be explained.

First, line-shaped stimulating light L emitted from readout exposure apparatus 200 is irradiated onto stimulable phosphor sheet 210. Note that by the conveying of sheet 210 in the direction of arrow Y (sub-scanning direction) by conveying means 240, the entire surface of sheet 210 is irradiated by stimulating light L.

From the portion of stimulable phosphor sheet 210 irradiated by stimulating light L there is produced stimulated emission M corresponding to the radiation image data cumulatively stored thereon. The thereby produced stimulated emission disperses in four directions, and one portion thereof enters the entry end-surface of photo detector 220, and another portion is reflected by light gathering mirror 230 and enters the entry end-surface of photo detector 220. At this time, stimulating light L reflected from the surface of stimulable phosphor sheet 210, which is mixed with a small amount of stimulated emission, is cutoff by stimulating light cutoff filter 15. Stimulated emissions M gathered in photo detector 220 is amplified in each photoelectric converting element, photoelectrically converted and output to an external signal processing apparatus as an image signal S of the pixel corresponding to each photoelectric converting element 222.

What is claimed is:

1. A readout exposure apparatus for reading out data recorded on an image detecting device by scanning said image detecting device with readout electromagnetic radiation, comprising:
   an exposure light source having a plurality of light emitting points arranged in a line-shape, and
   a first optical means that spatially filters the electromagnetic radiation emitted from each of said light emitting points of said exposure light source, and comprises an optical member for focusing said electromagnetic radiation through an opening having a slit,
   wherein the electromagnetic radiation emitted from each light emitting point passing through the first optical means enters the image detecting device after having been dispersed along the lengthwise direction of said exposure light source, whereby each portion of the image detection device is simultaneously exposed to the electromagnetic radiation emitted from multiple light emitting points from among said plurality of light emitting points.

2. An image readout exposure apparatus as defined in claim 1, wherein
   said slit opening portion extends along the lengthwise direction of said exposure light source, and
   said optical member of focuses the electromagnetic radiation emitted from each of said light emitting points in the direction perpendicular to said exposure light source.

3. An image readout exposure apparatus as defined in claim 1, further comprising a second optical means for focusing in the direction perpendicular to said exposure light source, the electromagnetic radiation that passes through said first optical means.

4. An image readout exposure apparatus as defined in claim 3, wherein
   said optical member is a SELFOC lens, and
   said second optical means is a cylindrical lens.

5. An image readout exposure apparatus as defined in claim 3, wherein said exposure light source comprises a plurality of LED or LD chips arranged in a line-shape.

6. An image readout exposure apparatus as defined in claim 5, wherein said image detection device is an electrostatic recording member that cumulatively stores image data as an electrostatic image, and generates an electric current corresponding to said electrostatic latent image upon being scanned and exposed by said readout electromagnetic radiation.

7. An image readout exposure apparatus as defined in claim 5, wherein said image detection device cumulatively stores image data, and contains stimulable phosphor particles that emit a stimulated emission corresponding to said image data upon being scanned and exposed by said readout electromagnetic radiation.

8. An image readout exposure apparatus as defined in claim 3, wherein
   said exposure light source comprises an LED or LD array.

9. An image readout exposure apparatus as defined in claim 3, wherein said image detection device is an electrostatic recording member that cumulatively stores image data as an electrostatic image, and generates an electric current corresponding to said electrostatic latent image upon being scanned and exposed by said readout electromagnetic radiation.

10. An image readout exposure apparatus as defined in claim 3, wherein said image detection device cumulatively stores image data, and contains stimulable phosphor particles that emit a stimulated emission corresponding to said image data upon being scanned and exposed by said readout electromagnetic radiation.

11. An image readout exposure apparatus as defined in claim 1, 2, or 4, wherein
    said exposure light source comprises a plurality of LED or LD chips arranged in a line-shape.

12. An image readout exposure apparatus as defined in claim 11, wherein said image detection device is an electrostatic recording member that cumulatively stores image data as an electrostatic image, and generates an electric current corresponding to said electrostatic latent image upon being scanned and exposed by said readout electromagnetic radiation.

13. An image readout exposure apparatus as defined in claim 11, wherein said image detection device cumulatively stores image data, and contains stimulable phosphor particles that emit a stimulated emission corresponding to said image data upon being scanned and exposed by said readout electromagnetic radiation.

14. An image readout exposure apparatus as defined in claim 1, 2, or 4, wherein said exposure light source comprises an LED or LD array.

15. An image readout exposure apparatus as defined in claim 1, 2, or 4, wherein said image detection device is an electrostatic recording member that cumulatively stores image data as an electrostatic image, and generates an electric current corresponding to said electrostatic latent image upon being scanned and exposed by said readout electromagnetic radiation.

16. An image readout exposure apparatus as defined in claim 1, 2, or 4, wherein said image detection device cumulatively stores image data, and contains stimulable phosphor particles that emit a stimulated emission corresponding to said image data upon being scanned and exposed by said readout electromagnetic radiation.

17. An image readout exposure apparatus as defined in claim 1, wherein the dispersed electromagnetic radiation is dispersed only along the lengthwise direction of said exposure light source.

18. An image readout exposure apparatus as defined in claim 1, wherein the image detecting device is uniformly exposed to the electromagnetic radiation emitted from the multiple light emitting points.

19. An image readout exposure apparatus as defined in claim 1, wherein each portion of the image detecting device is exposed simultaneously to light emitted from a first of the plurality of light emitting points and a second of the plurality of light emitting points, wherein the first and second light emitting points are adjacent to each other in the lengthwise direction of the exposure light source.

20. An image readout exposure apparatus according to claim 19, wherein each portion comprises a pixel.

21. An image readout exposure apparatus as defined in claim 19, further comprising a second optical means for focusing in the direction perpendicular to said exposure light source, the electromagnetic radiation that passes through said first optical means.

* * * * *